(12) United States Patent
Jia et al.

(10) Patent No.: US 11,783,502 B2
(45) Date of Patent: Oct. 10, 2023

(54) ELLIPSE DETECTION ACCELERATION METHOD BASED ON GENERALIZED PASCAL MAPPING

(71) Applicant: DALIAN UNIVERSITY OF TECHNOLOGY, Liaoning (CN)

(72) Inventors: Qi Jia, Liaoning (CN); Xin Fan, Liaoning (CN); Zhongxuan Luo, Liaoning (CN); Yu Liu, Liaoning (CN); Qian Wang, Liaoning (CN); Risheng Liu, Liaoning (CN); Yi Wang, Liaoning (CN); Xiujuan Xu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 171 days.

(21) Appl. No.: 17/437,234

(22) PCT Filed: Mar. 5, 2021

(86) PCT No.: PCT/CN2021/079208
§ 371 (c)(1),
(2) Date: Sep. 8, 2021

(87) PCT Pub. No.: WO2021/223505
PCT Pub. Date: Nov. 11, 2021

(65) Prior Publication Data
US 2022/0335639 A1    Oct. 20, 2022

(30) Foreign Application Priority Data
May 7, 2020 (CN) .......................... 202010375981.3

(51) Int. Cl.
*G06T 7/60* (2017.01)
*G06T 7/13* (2017.01)

(52) U.S. Cl.
CPC . *G06T 7/60* (2013.01); *G06T 7/13* (2017.01)

(58) Field of Classification Search
CPC .............. G06T 7/60; G06T 7/13; G06F 18/23
See application file for complete search history.

(56) References Cited

FOREIGN PATENT DOCUMENTS

| CN | 1564190 A   | 1/2005 |
| CN | 105931252 A | 9/2016 |
| CN | 111563925 A | 8/2020 |
| JP | 2006107117 A | 4/2006 |

OTHER PUBLICATIONS

Fornaciari et al., "A fast and effective ellipse detector for embedded vision applications", Pattern Recognition 47 (2014) 3693-3708 (Year: 2014).*

(Continued)

*Primary Examiner* — Qian Yang
(74) *Attorney, Agent, or Firm* — Muncy, Geissler, Olds & Lowe, P.C.

(57) ABSTRACT

The present invention relates to the technical field of digital image processing, and provides an ellipse detection acceleration method based on generalized Pascal mapping. The method comprises: step 100, extracting accurate edge points from a real image by means of an edge detection method of an ellipse detection method, connecting edge points into arcs, and taking a de-noised arc set as input of an ellipse detection acceleration method; step 200, screening out a valid candidate arc combinations probably belonging to the same ellipse from the arc set input in step 100; step 300, calculating five parameters of a candidate ellipse; repeating step 200 to step 300 until all valid candidate arc combinations in the arc set and corresponding candidate ellipses are found; and step 400, clustering and verifying candidate ellipse sets, obtaining a final detected ellipse set.

3 Claims, 2 Drawing Sheets

(56) References Cited

OTHER PUBLICATIONS

Wang et al., "A Fast and Robust Ellipse-Detection Method Based on Sorted Merging", Hindawi Publishing Corporation The Scientific World Journal, vol. 2014, Article ID 481312, 15 pages (Year: 2014).*
Ho et al., "A Fast Ellipse/Circle Detector Using Geometric Symmetry", Pattern Recognition, vol. 28, No. I, pp. 117-124, 1995 (Year: 1995).*
Yao et al., "A multi-population genetic algorithm for robust and fast ellipse detection", Pattern Anal Applic (2005) 8: 149-162 (Year: 2005).*
Xie et al., "A New Efficient Ellipse Detection Method", 2002 International Conference on Pattern Recognition (Year: 2002).*
Zhang et al., "A robust, real-time ellipse detector", Pattern Recognition 38 (2005) 273-287 (Year: 2005).*
Lu et al., "Arc-Support Line Segments Revisited: An Efficient High-Quality Ellipse Detection", IEEE Transactions on Image Processing, vol. 29, 2020 (Year: 2020).*
Dong et al., "Fast Ellipse Detection via Gradient Information for Robotic Manipulation of Cylindrical Objects", IEEE Robotics and Automation Letters, vol. 3, No. 4, Oct. 2018 (Year: 2018).*
Song et al., "Ellipse detection approach based on convex hull," Opto-Electronic Engineering, vol. 34, No. 10, Oct. 2007, 5 pages.
Dalian University of Technology, "Researches and Implementations of Fast Ellipse Detector Based on Projective Invariant Pruning," Mar. 20, 2017, 61 pages.

* cited by examiner

ELLIPSE DETECTION ACCELERATION METHOD BASED ON GENERALIZED PASCAL MAPPING

TECHNICAL FIELD

The present invention relates to the technical field of digital image processing, and in particular to an ellipse detection acceleration method based on generalized Pascal mapping.

BACKGROUND

As one of the most important basic tasks in the computer vision system, ellipse detection is widely used in various practical scenarios, for example, camera focusing on elliptic objects, robot manipulating cylindrical objects as well as unmanned aerial vehicle landing or medical diagnosis. When ellipse detection is used in these natural scenarios, not only the accurate detection of elliptic objects should be ensured, but also computation should be reduced as much as possible in limited computing resources to ensure the timeliness of actions.

The earliest ellipse detection method was initiated by Hough Transform (HT), which found ellipse edges by voting in the five-dimensional parameter space of an ellipse, and extended the Probability Hough Transform (PHT) and Random Hough Transform (RHT), however, they both involved a large number of voting candidates, so a lot of computing resources were consumed. Another idea is to reduce the number of candidate objects by using geometric constraints of ellipse edges, so as to achieve the purpose of acceleration. However, due to large base number and discreteness of edge points, it is often difficult to give consideration to both accuracy and efficiency without relying on a large amount of computing resources. Some arc-based ellipse detection methods try to use the geometric relationship between arcs to filter some invalid combinations so as to accelerate the fitting. However, inevitably, there is still a need to compute ellipse parameters, so the computation efficiency is not high.

SUMMARY

In order to overcome the timeliness problem of the existing ellipse detection method in limited computing resources, the present invention provides an ellipse detection acceleration method based on generalized Pascal mapping, which can be embedded in an ellipse detection method, to select valid candidate arc combinations by an acceleration module through a small amount of computation, reducing computation of invalid ellipse fitting, and ensuring the detection accuracy.

The present invention provides an ellipse detection acceleration method based on generalized Pascal mapping, comprising the following steps:

step 100, extracting accurate edge points from a real image by means of an edge detection method of an ellipse detection method, connecting edge points into arcs, and taking a de-noised arc set as input of an ellipse detection acceleration method;

step 200, screening out a valid candidate arc combination probably belonging to the same ellipse from the arc set input in step 100 by means of generalized Pascal mapping, including the following specific steps:

step 201, selecting two arcs or three arcs from the arc set input in step 100;

step 202, selecting endpoints and midpoints of the two arcs to form six points or selecting endpoints of the three arcs to form six points, and computing coordinate information of three mapping points formed by the six points through generalized Pascal mapping by using coordinate information of the six points;

step 203, fitting a line using the coordinate information of the mapping points by the least squares method, and computing the maximum collinear error of the three mapping points; if the maximum collinear error is less than the threshold, confirming that the three mapping points are collinear, and the corresponding arc combination which contains two arcs or three arcs forms a valid candidate arc combination belonging to the same ellipse;

step 300, according to the valid candidate arc combination output in step 200, computing five parameters of a candidate ellipse: center coordinates, major axis and minor axis, angle between the major axis and the X coordinate axis; repeating step 200 to step 300 until all valid candidate arc combinations in the arc set and corresponding candidate ellipses are found;

step 400, clustering and verifying candidate ellipse sets by using the clustering and verifying method of the ellipse detection method, eliminating similar ellipses and false positive ellipses caused by errors, obtaining a final detected ellipse set.

Preferably, step 202 of selecting endpoints and midpoints of the two arcs to form six points or selecting endpoints of the three arcs to form six points, and computing coordinate information of three mapping points formed by the six points through generalized Pascal mapping by using coordinate information of the six points specifically includes:

selecting six points $\{Q_x^{(y)}\}_{x=1,2,3}^{y=1,2}$ from the two arcs $\overarc{arc}_i$, $\overarc{arc}_j$ or three arcs $\overarc{arc}_i$, $\overarc{arc}_j$, $\overarc{arc}_k$ selected in step 201, computing three mapping points $\{R_x\}_{x=1,2,3}$ of the six points, where:

$$\begin{cases} R_1 = <(Q_2^{(1)}, Q_3^{(1)}), (Q_1^{(1)}, Q_1^{(2)})> \\ R_2 = <(Q_1^{(2)}, Q_3^{(2)}), (Q_2^{(1)}, Q_2^{(2)})> \\ R_3 = <(Q_1^{(1)}, Q_2^{(2)}), (Q_3^{(1)}, Q_3^{(2)})> \end{cases}$$

recording $(Q_2^{(1)}, Q_3^{(1)})$ as a straight line where $Q_2^{(1)}, Q_3^{(1)}$ are located, recording $<(Q_2^{(1)}, Q_3^{(1)}), (Q_1^{(1)}, Q_1^{(2)})>$ as an intersection of the straight line and a straight line $(Q_1^{(1)}, Q_1^{(2)})$; six straight lines intersecting in pairs at three points $R_1$, $R_2$, $R_3$ respectively, so $R_1$, $R_2$, $R_3$ are the coordinate information about the three mapping points.

Preferably, step 203 of fitting a line using the coordinate information of the mapping points by the least square method, and computing the maximum collinear error of the three mapping points; and if the maximum collinear error is less than the threshold, confirming that the three mapping points are collinear, and the corresponding arc combination which contains two arcs or three arcs forms a valid candidate arc combination belonging to the same ellipse specifically includes:

fitting a line of the three mapping points $\{R_x\}_{x=1,2,3}$ by means of the least squares method:

$$L = \text{Least\_Squares}(R_1, R_2, R_3)$$

computing the distances of the three points to the line by means of the formula of distance from point to line:

$$\begin{cases} d_1 = \text{Distance\_Formula}(R_1, L) \\ d_2 = \text{Distance\_Formula}(R_2, L) \\ d_3 = \text{Distance\_Formula}(R_3, L) \end{cases}$$

obtaining the maximum distance $\text{MAX}_d = \max\{d_1, d_2, d_3\}$ from the mapping points to the line; if the maximum distance $\text{MAX}_d$ is less than the threshold $\text{Th}_{ED}$, confirming that the three mapping points are collinear, forming a valid candidate arc combination $\overset{\frown}{arc_i}$, $\overset{\frown}{arc_j}$ or $\overset{\frown}{arc_i}$, $\overset{\frown}{arc_j}$, $\overset{\frown}{arc_k}$ which contains two arcs or three arcs belonging to the same ellipse.

The present invention has the advantageous effects that the ellipse detection acceleration method based on generalized Pascal mapping proposed by the present invention can be embedded into the existing arc-based ellipse detection method. Thus, the operating time is reduced, the timeliness problem of the existing ellipse detection method in limited computing resources is solved, and the accuracy of ellipse detection is ensured. The main idea of the present invention is to select valid candidate arc combinations most possibly belonging to the same ellipse by using an acceleration module before ellipse fitting, so as to reduce fitting operations of invalid ellipses, thereby accelerating the ellipse detection method.

DETAILED DESCRIPTION

To make the technical problem solved, the technical solution adopted and the technical effect achieved by the present invention more clear, the present invention will be further described below in detail in combination with the drawings and the embodiments. It should be understood that the specific embodiments described herein are only used for explaining the present invention, not used for limiting the present invention. In addition, it should be noted that for ease of description, the drawings only show some portions related to the present invention rather than all portions.

Figure 1:
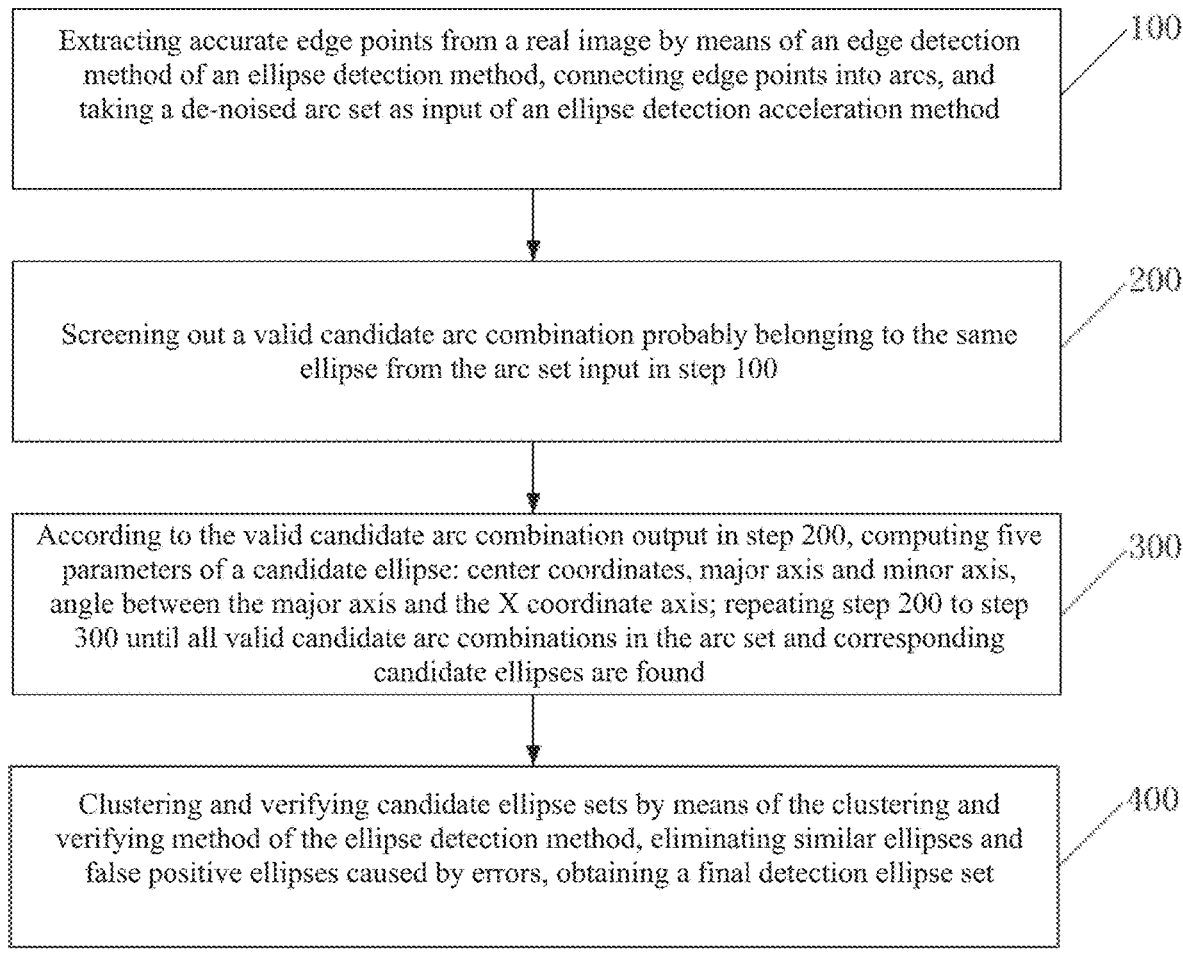
FIG. 1 is a workflow chart of an ellipse detection acceleration method based on generalized Pascal mapping provided by the present invention.

FIG. 1 is a workflow chart of an ellipse detection acceleration method based on generalized Pascal mapping provided by the present invention. As shown in FIG. 1, the present invention provides an ellipse detection acceleration method based on generalized Pascal mapping, comprising the following steps:

Step 100, extracting accurate edge points from a real image by means of an edge detection method of an ellipse detection method, connecting edge points into arcs, and taking a de-noised arc set as input of an ellipse detection acceleration method.

Figure 2:
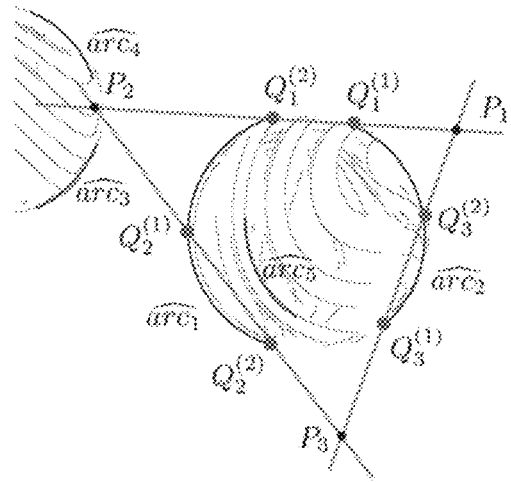
FIG. 2 is a schematic diagram of six points selected from an arc combination.

Edge detection may be conducted by means of frequently-used edge detection methods such as image graying, Canny edge detector, etc. De-noising may be conducted by means of methods such as noise arc filtering, straight arc filtering etc. As shown in FIG. 2, the arc set is represent by S, S={ $\overset{\frown}{arc_1}$, $\overset{\frown}{arc_2}$, $\overset{\frown}{arc_3}$, $\overset{\frown}{arc_4}$, $\overset{\frown}{arc_5}$ }.

Step 200, screening out a valid candidate arc combination probably belonging to the same ellipse from the arc set input in step 100 by means of generalized Pascal mapping.

Step 201, selecting two arcs or three arcs from the arc set input in step 100.

In this embodiment, two arcs or three arcs are selected, or more arcs may be selected according to actual conditions; arcs may be selected in flexible ways, may be directly traversed or randomly selected from the arc set S; and may be selected in combination with the existing arc selection conditions in the existing ellipse detection method. As shown in FIG. 2, two arcs $\overset{\frown}{arc_1}$, $\overset{\frown}{arc_2}$ are directly selected, and the selected two arcs or three arcs are taken as one arc combination.

Step 202, selecting endpoints and midpoints of the two arcs to form six points or selecting endpoints of the three arcs to form six points, and computing coordinate information of three mapping points formed by the six points through generalized Pascal mapping by using coordinate information of the six points.

Generalized Pascal mapping is usually used to describe a mapping relationship between points on a high-dimensional curve and a low-dimensional curve. For example, on a two-dimensional plane, 3n points on one n-order curve may be mapped to obtain 3(n−1) points corresponding thereto on one (n−1)-order curve. In the present invention, constraints are constructed by means of the mapping relationship between points on one n-order curve (n=2) and one n-order curve (n=1) and are applied to ellipse detection.

Specific description: FIG. 2 is a schematic diagram of six points selected from an arc combination. As shown in FIG. 2, two arcs $\overset{\frown}{arc_1}$, $\overset{\frown}{arc_2}$ are selected from the arc set S in an example diagram, and six points $\{Q_x^{(y)}\}_{x=1,2,3}^{y=1,2}$ are selected from the arc combination. $Q_1^{(2)}, Q_2^{(2)}$ represent endpoints of arc $\overset{\frown}{arc_1}$, $Q_2^{(1)}$ represents midpoint of arc $\overset{\frown}{arc_1}$; $Q_1^{(1)}, Q_3^{(1)}$ represent endpoints of arc $\overset{\frown}{arc_2}$, $Q_3^{(2)}$ represents midpoint of arc $\overset{\frown}{arc_2}$. $P_1P_2$ represents a straight line where $Q_1^{(1)}, Q_1^{(2)}$ are located, $P_2P_3$ represent a straight line where $Q_2^{(1)}, Q_2^{(2)}$ are located, and $P_3P_1$ represents a straight line where $Q_3^{(1)}, Q_3^{(2)}$ are located. Straight lines $P_1P_2$, $P_2P_3$ intersect at a point $P_2$, straight lines $P_2P_3$, $P_3P_1$ intersect at a point $P_3$, and straight lines $P_3P_1$, $P_1P_2$ intersect at a point $P_1$.

Six points $\{Q_x^{(y)}\}_{x=1,2,3}^{y=1,2}$ are selected from the arc combination containing two arcs $\overset{\frown}{arc_1}$, $\overset{\frown}{arc_2}$ selected in step 201. In this embodiment, endpoints and midpoints of the two arcs are respectively selected to form six points (or endpoints of three arcs are selected to form six points when containing three arcs $\overset{\frown}{arc_3}$, $\overset{\frown}{arc_4}$, $\overset{\frown}{arc_5}$); three mapping points $\{R_x\}_{x=1,2,3}$ formed by the six points are computed, where:

$$\begin{cases} R_1 = <(Q_2^{(1)}, Q_3^{(1)}), (Q_1^{(1)}, Q_1^{(2)})> \\ R_2 = <(Q_1^{(2)}, Q_3^{(2)}), (Q_2^{(1)}, Q_2^{(2)})> \\ R_3 = <(Q_1^{(1)}, Q_2^{(2)}), (Q_3^{(1)}, Q_3^{(2)})> \end{cases}$$

Figure 3:
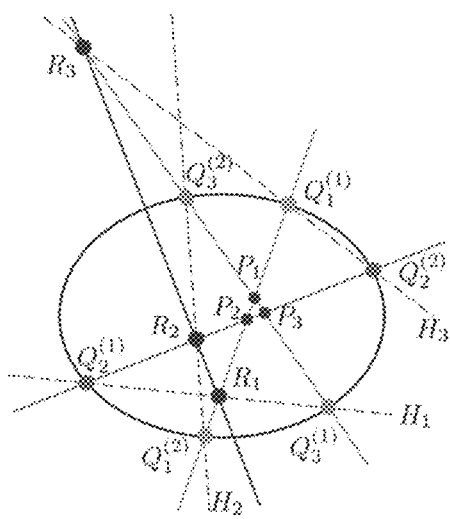
FIG. 3 is a schematic diagram showing a mapping process of three mapping points on a straight line formed by six points.

$(Q_2^{(1)}, Q_3^{(1)})$ is recorded as a straight line where $Q_2^{(1)}$, $Q_3^{(1)}$ are located, $<(Q_2^{(1)}, Q_3^{(1)}), (Q_1^{(1)}, Q_1^{(2)})>$ is recorded as an intersection of the straight line $(Q_2^{(1)}, Q_3^{(1)})$ and a straight line $(Q_1^{(1)}, Q_1^{(2)})$, and the like. FIG. 3 is a schematic diagram showing a mapping process of three mapping points on a straight line formed by six points. As shown in FIG. 3, six points $\{Q_x^{(y)}\}_{x=1,2,3}^{y=1,2}$ on the same ellipse are mapped to three points $\{R_x\}_{x=1,2,3}$ on the same straight line. The straight line $Q_2^{(1)}, Q_3^{(1)}$ where $(Q_2^{(1)}, Q_3^{(1)})$ are located is recorded as $H_1$, the straight line $Q_1^{(1)}, Q_1^{(2)}$ where $(Q_1^{(1)}, Q_1^{(2)})$ are located is recorded as $P_1P_2$, and the like, where straight lines $H_1$, $P_1P_2$ intersect at a point $R_1$; straight lines $H_2$, $P_2P_3$ intersect at a point $R_2$, and straight lines $H_3$, $P_3P_1$ intersect at a point $R_3$. The three points $R_1$, $R_2$, $R_3$ obtained by the six straight lines intersecting in pairs are coordinate information about the three mapping points.

Step 203, fitting a line using the coordinate information of the mapping points by the least squares method, and computing the maximum collinear error of the three mapping points; if the maximum collinear error is less than a threshold, confirming that the three mapping points are collinear, that is, the two arcs or three arcs belonging to the same ellipse, forming a valid candidate arc combination which contains two arcs or three arcs belonging to the same ellipse.

In this step, the valid candidate arc combination is determined mainly by judging the degree of collinearity of the three mapping points, specifically including: fitting a line of the three mapping points $\{R_x\}_{x=1,2,3}$ by means of the least squares method:

$$L = \text{Least\_Squares}(R_1, R_2, R_3)$$

computing the distances of three points to the line by means of the formula of distance from point to line:

$$\begin{cases} d_1 = \text{Distance\_Formula}(R_1, L) \\ d_2 = \text{Distance\_Formula}(R_2, L) \\ d_3 = \text{Distance\_Formula}(R_3, L) \end{cases}$$

obtaining the maximum distance $\text{MAX}_d = \max\{d_1, d_2, d_3\}$ from the mapping points to the line, the maximum distance being the maximum collinear error. if the maximum distance, i.e. the maximum collinear error $\text{MAX}_d$ is less than the certain threshold $\text{Th}_{ED}$, confirming that the three mapping points are collinear, that is, the two arcs or three arcs belong to the same ellipse, forming a valid candidate arc combination which contains two arcs or three arcs belonging to the same ellipse, that is, the arc combination $\overparen{arc}_1$, $\overparen{arc}_2$ (or $\overparen{arc}_3$, $\overparen{arc}_4$, $\overparen{arc}_5$) is a valid candidate arc combination probably belonging to the same ellipse.

Step 300, according to the valid candidate arc combination output in step 200, computing five parameters of a candidate ellipse: center coordinates (x, y), major axis and minor axis a, b, angle $\phi$ between the major axis and the X coordinate axis, repeating step 200 to step 300 until all valid candidate arc combinations in the arc set S and corresponding candidate ellipses are found.

In this step, a valid candidate arc combination is selected from the arc set by means of generalized Pascal mapping. Five parameters of a candidate ellipse are computed by means of frequently-used parameter computation methods such as parallel chord method, etc. A set of five parameters of an ellipse can uniquely represent one ellipse. According to the computed five parameters of the ellipse, all valid candidate arc combinations in the arc set S and corresponding candidate ellipses are determined.

Step 400, clustering and verifying candidate ellipse sets by means of the clustering and verifying method of the ellipse detection method, eliminating similar ellipses and false positive ellipses caused by errors, obtaining a final detected ellipse set.

In this step, candidate ellipse sets are clustered and verified by means of frequently-used methods such as parameter clustering, center point verification, etc.

This embodiment is illustrated in the form of examples as follows:

1. Extracting accurate edge points from a real image by means of a Canny edge detector of an ellipse detection method, connecting edge points into arcs, and taking a de-noised arc set S (as shown in FIG. 2, S={$\overparen{arc}_1$, $\overparen{arc}_2$, $\overparen{arc}_3$, $\overparen{arc}_4$, $\overparen{arc}_5$}) as input of an ellipse detection acceleration method.

2. Screening out a valid candidate arc combination probably belonging to the same ellipse from the arc set input in step 1.

2-1. Selecting two arcs $\overparen{arc}_1$, $\overparen{arc}_2$ from the arc set.

2-2. Selecting endpoints and midpoints of the two arcs to form six points, and computing coordinate information of three mapping points formed by the six points through generalized Pascal mapping.

As shown in FIG. 2, six points $\{Q_x^{(y)}\}_{x=1,2,3}^{y=1,2}$ are selected from the arc combination containing two arcs $\overparen{arc}_1$, $\overparen{arc}_2$ selected in step 2-1. In this patent, endpoints and midpoints of two arcs are respectively selected to form six points. As shown in FIG. 3, three mapping points $\{R_x\}_{x=1,2,3}$ formed by the six points are computed, where:

$$\begin{cases} R_1 = <(Q_2^{(1)}, Q_3^{(1)}), (Q_1^{(1)}, Q_1^{(2)})> \\ R_2 = <(Q_1^{(2)}, Q_3^{(2)}), (Q_2^{(1)}, Q_2^{(2)})> \\ R_3 = <(Q_1^{(1)}, Q_2^{(2)}), (Q_3^{(1)}, Q_3^{(2)})> \end{cases}$$

$(Q_2^{(1)}, Q_3^{(1)})$ is recorded as a straight line where $Q_2^{(1)}$, $Q_3^{(1)}$ are located $<(Q_2^{(1)}, Q_3^{(1)}), (Q_1^{(1)}, Q_1^{(2)})>$ is recorded as an intersection of the straight line $(Q_2^{(1)}, Q_3^{(1)})$ and a straight line $(Q_1^{(1)}, Q_1^{(2)})$, and the like. The specific computation process of generalized Pascal mapping is as follows:

The coordinates of the six points are expressed as:

$$\begin{cases} Q_1^{(1)}(2, 4.0988), & Q_1^{(2)}(-0.5, -4.4497); \\ Q_2^{(1)}(-4, -2.6833), & Q_2^{(2)}(4, 2.6833); \\ Q_3^{(1)}(3, -3.5777), & Q_3^{(2)}(-1, 4.3818) \end{cases}$$

The coordinate computation process of point $R_1$ is expressed as:

$$\begin{cases} L_{Q_2^{(1)} Q_3^{(1)}} : -0.89443x - 7y - 22.3607 = 0 \\ L_{Q_1^{(1)} Q_1^{(2)}} : -8.5485x - 2.5y + 6.85 = 0 \\ R_1 = <L_{Q_2^{(1)} Q_3^{(1)}}, L_{Q_1^{(1)} Q_1^{(2)}}> = (-0.1281, -3.178) \end{cases}$$

The coordinate computation process of point $R_2$ is expressed as:

$$\begin{cases} L_{Q_1^{(2)} Q_3^{(2)}} : -8.8315x - 0.5y - 6.6406 = 0 \\ L_{Q_2^{(1)} Q_2^{(2)}} : 5.3666x - 8y + 0 = 0 \\ R_2 = <L_{Q_1^{(3)} Q_3^{(2)}}, L_{Q_2^{(1)} Q_2^{(2)}}> = (-0.7244, -0.4859) \end{cases}$$

The coordinate computation process of point $R_3$ is expressed as:

$$\begin{cases} L_{Q_1^{(1)}Q_2^{(2)}}: -1.4155x - 2y + 11.0286 = 0 \\ L_{Q_3^{(1)}Q_3^{(2)}}: 7.9595x + 4y - 9.5676 = 0 \\ R_3 = <L_{Q_1^{(1)}Q_2^{(2)}}, L_{Q_3^{(1)}Q_3^{(2)}}> = (-2.435, 7.238) \end{cases}$$

where $L_{Q_2^{(1)}Q_3^{(1)}}$ is an equation of the straight line $H_1$, $L_{Q_1^{(1)}Q_1^{(2)}}$ is an equation of the straight line $P_1P^2$, the two straight lines intersect at a point $R_1$, and the like. The three points $R_1$, $R_2$, $R_3$ obtained by the six straight lines intersecting in pairs are coordinate information about the three mapping points.

2-3. Judging the degree of collinearity of the three mapping points, screening out a valid candidate arc combination belonging to the same ellipse.

On the basis of step 2-2, a line of the three mapping points $\{R_x\}_{x=1,2,3}$ is fitted by means of the least squares method:

$$\begin{cases} L = \text{Least\_Squares}(R_1, R_2, R_3) \\ L: y = -4.5152x - 3.7565 \end{cases}$$

the distances of the three points to the line are computed by means of the formula of distance from point to line:

$$\begin{cases} d_1 = \text{Distance\_formula}(R_1, L) = 0.2225 * 10^{-4} \\ d_2 = \text{Distance\_formula}(R_2, L) = 0.4560 * 10^{-4} \\ d_3 = \text{Distance\_formula}(R_3, L) = 0.0259 * 10^{-4} \end{cases}$$

the maximum distance $MAX_d = \max\{d_1, d_2, d_3\} = 0.4560*10^{-4}$ is obtained; if the maximum distance, i.e. the maximum collinear error $MAX_d$ is less than a certain threshold $Th_{ED}$ (in this embodiment, the threshold is selected to be $Th_{ED} \leq 2.97$), the slightly large threshold is to set aside a tolerable error range for the noise which possibly exists at image edge points; in this embodiment, the maximum collinear error is relatively small because points are selected accurately and basically fall on the detection ellipse, while most of the points cannot be accurately selected during detection), it is confirmed that the three mapping points are collinear, that is, the arc combination $\widehat{arc_1}$, $\widehat{arc_2}$ is a valid candidate arc combination most possibly belonging to the same ellipse.

3. According to the valid candidate arc combination output in step 2, computing five parameters of a candidate ellipse by means of frequently-used parameter computation methods such as parallel chord method, etc.: center coordinates (0,0), major axis and minor axis 10, $4\sqrt{5}$ angle 0° between the major axis and the X coordinate axis (the standard equation thereof is as follows:

$$\frac{x^2}{25} + \frac{y^2}{20} = 1);$$

repeating step 200 to step 300 until all valid candidate arc combinations in the arc set S and corresponding candidate ellipses are found.

4. Clustering and verifying candidate ellipse sets by means of frequently-used methods such as parameter clustering, center point verification, etc., eliminating similar ellipses and false positive ellipses caused by errors, obtaining a final detected ellipse set.

Finally, it should be noted that the above embodiments are only used for describing the technical solution of the present invention rather than limiting the present invention. Although the present invention is described in detail by referring to the above embodiments, those ordinary skilled in the art should understand that: the amendments to the technical solution recorded in each of the above embodiments or the equivalent replacements for part of or all the technical features therein do not enable the essence of the corresponding technical solution to depart from the scope of the technical solution of various embodiments of the present invention.

The invention claimed is:

1. An ellipse detection acceleration method based on generalized Pascal mapping, comprising:

step 100, extracting edge points from a real image by means of an edge detection method, connecting the edge points into arcs, and taking a de-noised arc set as input of the ellipse detection acceleration method;

step 200, selecting a valid candidate arc combination probably belonging to a same ellipse from the arc set input in step 100 by means of the generalized Pascal mapping, comprising:

step 201, selecting two arcs or three arcs from the arc set input in step 100;

step 202, selecting endpoints and midpoints of the two arcs to form six points or selecting endpoints of the three arcs to form six points, and computing coordinate information of three mapping points formed by the six points through generalized Pascal mapping by using the coordinate information;

step 203, fitting a line using the coordinate information of the three mapping points by a least squares method, computing a maximum collinear error of the three mapping points, if the maximum collinear error is less than a threshold, confirming that the three mapping points are collinear, and the corresponding arc set input which contains the two arcs or the three arcs forms the valid candidate arc combination belonging to the same ellipse;

step 300, according to the valid candidate arc combination output in step 200, computing four parameters of a candidate ellipse, wherein the four parameters comprise center coordinates, major axis, minor axis, and an angle between the major axis and an X coordinate axis, repeating step 200 to step 300 until all the valid candidate arc combinations in the arc set and the corresponding candidate ellipses are found;

step 400, clustering and verifying the candidate ellipses by means of a clustering and verifying method of an ellipse detection method, eliminating duplicated ellipses and false positive ellipses caused by errors, obtaining a final detected ellipse set.

2. The ellipse detection acceleration method based on generalized Pascal mapping according to claim 1, wherein the step 202 further comprises:

selecting the six points $\{Q_x^{(y)}\}_{x=1,2,3}^{y=1,2}$ from the two arcs $\widehat{arc_i}$, $\widehat{arc_j}$ or the three arcs $\widehat{arc_i}$, $\widehat{arc_j}$, $\widehat{arc_k}$, selected in step 201, computing the three mapping points $\{R_x\}_{x=1,2,3}$ of the six points, wherein $$\begin{cases} R_1 = <(Q_2^{(1)}, Q_3^{(1)}), (Q_1^{(1)}, Q_1^{(2)})> \\ R_2 = <(Q_1^{(2)}, Q_3^{(2)}), (Q_2^{(1)}, Q_2^{(2)})> ; \text{and} \\ R_3 = <(Q_1^{(1)}, Q_2^{(2)}), (Q_3^{(1)}, Q_3^{(2)})> \end{cases}$$

Recording $(Q_2^{(1)}, Q_3^{(1)})$ as a straight line where $(Q_2^{(1)}, Q_3^{(1)})$ are located, recording $<(Q_2^{(1)}, Q_3^{(1)}), (Q_1^{(1)}, Q_1^{(2)})>$ as an intersection of the straight line $(Q_2^{(1)}, Q_3^{(1)})$ and a straight line $(Q_1^{(1)}, Q_1^{(2)})$; six straight lines intersecting in pairs at three points $R_1, R_2, R_3$ respectively, wherein $R_1, R_2, R_3$ are the coordinate information of the three mapping points.

3. The ellipse detection acceleration method based on generalized Pascal mapping according to claim 1, wherein the step 203 further comprises:

fitting a line of the three mapping points $\{R_x\}_{x=1,2,3}$ by means of the least squares method:

$L = \text{Least\_Squares}(R_1, R_2, R_3);$ computing distances of the three mapping points to the line by means of a formula of distance from point to line:

$$\begin{cases} d_1 = \text{Distance\_Formula}(R_1, L) \\ d_2 = \text{Distance\_Formula}(R_2, L) ; \text{and} \\ d_3 = \text{Distance\_Formula}(R_3, L) \end{cases}$$

obtaining a maximum distance $\text{MAX}_d = \max\{d_1, d_2, d_3\}$ from the three mapping points to the line; if the maximum distance $\text{MAX}_d$ is less than the threshold $\text{Th}_{ED}$, confirming that the three mapping points are collinear, forming the valid candidate arc combination $\widehat{arc_i}, \widehat{arc_j}$, or $\widehat{arc_i}, \widehat{arc_j}, \widehat{arc_k}$ which contains the two arcs or the three arcs belonging to the same ellipse.

\* \* \* \* \*